US 11,122,551 B2

(12) United States Patent
Kwon et al.

(10) Patent No.: US 11,122,551 B2
(45) Date of Patent: Sep. 14, 2021

(54) SYSTEMS AND METHODS FOR MODULATION AND CODING SCHEME SELECTION AND CONFIGURATION

(71) Applicant: Apple Inc., Cupertino, CA (US)

(72) Inventors: Hwan-Joon Kwon, Portland, OR (US); Alexei Davydov, Nizhny Novgorod (RU); Seunghee Han, San Jose, CA (US); Gregory V. Morozov, Nizhny Novgorod (RU); Youn Hyoung Heo, Seoul (KR)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/457,367

(22) Filed: Jun. 28, 2019

(65) Prior Publication Data
US 2019/0364545 A1 Nov. 28, 2019

Related U.S. Application Data

(63) Continuation of application No. 14/498,502, filed on Sep. 26, 2014, now abandoned.
(Continued)

(51) Int. Cl.
*H04W 72/04* (2009.01)
*H04L 1/00* (2006.01)
(Continued)

(52) U.S. Cl.
CPC ......... *H04W 72/042* (2013.01); *H04L 1/0001* (2013.01); *H04L 1/0003* (2013.01);
(Continued)

(58) Field of Classification Search
None
See application file for complete search history.

(56) References Cited

U.S. PATENT DOCUMENTS 8,340,676 B2  12/2012  Nory et al.
8,537,862 B2  9/2013  Blankenship et al.
(Continued)

FOREIGN PATENT DOCUMENTS

CN  101517984 A  8/2009
CN  102595469 A  7/2012
(Continued)

OTHER PUBLICATIONS

U.S. Appl. No. 14/496,970, Non-Final Office Action, dated Feb. 26, 2016, 19 pages.
(Continued)

*Primary Examiner* — Mariela Vidal Carpio
(74) *Attorney, Agent, or Firm* — Stoel Rives LLP

(57) ABSTRACT

A mobile communication device includes a table component, a table selection component, a control information component, and a communication component. The table component is configured to maintain two or more tables each having entries for a plurality of available modulation schemes. The table selection component is configured to select a selected table from one of the default table and the secondary table based on one or more of RRC layer signaling and MAC layer signaling and further based based on a control information format for control information received from the eNB. The control information component is configured to receive control information indicating a modulation and coding scheme from the selected table, and the communication component is configured to receive and process a communication from the eNB based on the modulation and coding scheme from the selected table.

8 Claims, 6 Drawing Sheets

Related U.S. Application Data

(60) Provisional application No. 61/924,194, filed on Jan. 6, 2014.

(51) Int. Cl.
| | | |
|---|---|---|
| *H04L 5/14* | (2006.01) | |
| *H04W 72/08* | (2009.01) | |
| *H04W 28/06* | (2009.01) | |
| *H04L 27/34* | (2006.01) | |
| *H04W 28/08* | (2009.01) | |

(52) U.S. Cl.
CPC .......... *H04L 1/0009* (2013.01); *H04L 1/0016* (2013.01); *H04L 1/0026* (2013.01); *H04L 5/1453* (2013.01); *H04W 72/085* (2013.01); *H04L 27/34* (2013.01); *H04W 28/06* (2013.01); *H04W 28/08* (2013.01)

(56) References Cited

U.S. PATENT DOCUMENTS

| | | | |
|---|---|---|---|
| 8,687,575 B2 | 4/2014 | Takaoka et al. | |
| 9,419,772 B2 | 8/2016 | Kim et al. | |
| 9,426,071 B1 | 8/2016 | Caldejon et al. | |
| 9,467,269 B2 | 10/2016 | Davydov et al. | |
| 9,648,601 B2 | 5/2017 | Wang et al. | |
| 2009/0109909 A1 | 4/2009 | Onggosanusi et al. | |
| 2009/0154588 A1* | 6/2009 | Chen | H04L 1/0026 375/267 |
| 2010/0110982 A1 | 5/2010 | Roh et al. | |
| 2011/0205988 A1 | 8/2011 | Zhang et al. | |
| 2011/0250848 A1* | 10/2011 | Bergljung | H04L 1/0026 455/67.11 |
| 2013/0003663 A1 | 1/2013 | Blankenship et al. | |
| 2013/0021980 A1* | 1/2013 | Yang | H04L 5/001 370/328 |
| 2013/0121168 A1 | 5/2013 | Luo et al. | |
| 2013/0188473 A1 | 7/2013 | Dinan | |
| 2013/0242923 A1 | 9/2013 | Yang et al. | |
| 2013/0301542 A1 | 11/2013 | Krishnamurthy et al. | |
| 2013/0308723 A1 | 11/2013 | Miyata | |
| 2014/0045497 A1 | 2/2014 | Abe et al. | |
| 2014/0169297 A1* | 6/2014 | Kim | H04L 1/0016 370/329 |
| 2014/0192732 A1* | 7/2014 | Chen | H04L 1/0026 370/329 |
| 2015/0036590 A1* | 2/2015 | Lahetkangas | H04L 1/0003 370/328 |
| 2015/0163773 A1* | 6/2015 | Wang | H04L 1/003 370/329 |
| 2015/0195819 A1 | 7/2015 | Kwon et al. | |
| 2015/0223235 A1* | 8/2015 | Hwang | H04W 72/0413 370/329 |
| 2015/0289237 A1* | 10/2015 | Kim | H04L 5/0094 370/329 |
| 2015/0372784 A1 | 12/2015 | Xu et al. | |
| 2015/0381254 A1* | 12/2015 | Liang | H04B 7/0619 370/329 |
| 2016/0226623 A1* | 8/2016 | Froberg Olsson | H04B 7/0632 |
| 2016/0249338 A1* | 8/2016 | Hwang | H04L 5/1469 |
| 2016/0337023 A1* | 11/2016 | Yi | H04L 5/0091 |
| 2016/0381674 A1* | 12/2016 | Kim | H04L 1/189 370/329 |
| 2017/0208570 A1 | 7/2017 | Wang et al. | |
| 2017/0273027 A1* | 9/2017 | Kim | H04W 52/48 |

FOREIGN PATENT DOCUMENTS

| | | |
|---|---|---|
| CN | 103746776 A | 4/2014 |
| EP | 1901496 B1 | 9/2010 |
| EP | 2787670 A1 | 10/2014 |
| EP | 2888827 A1 | 7/2015 |
| JP | 2004172981 A | 6/2004 |
| JP | 2015530033 A | 10/2015 |
| JP | 2016514921 A | 5/2016 |
| RU | 2525084 C2 | 12/2012 |
| RU | 2012102387 A | 7/2013 |
| WO | 2008111809 A2 | 9/2008 |
| WO | 2009055401 A1 | 4/2009 |
| WO | 2010055676 A1 | 5/2010 |
| WO | 2011111961 A2 | 9/2011 |
| WO | 2011111961 A3 | 9/2011 |
| WO | 2013123961 A1 | 8/2013 |
| WO | 2013124266 A1 | 8/2013 |
| WO | 2013135475 A1 | 9/2013 |
| WO | 2013173023 A1 | 11/2013 |
| WO | 2014029108 A1 | 2/2014 |
| WO | 2014161820 A1 | 10/2014 |

OTHER PUBLICATIONS

U.S. Appl. No. 14/496,970, Supplemental Notice of Allowability, dated Jul. 6, 2016, 5 pages.
U.S. Appl. No. 14/496,970, Notice of Allowance, dated Jun. 27, 2016, 11 pages.
U.S. Appl. No. 14/498,502, Non-Final Office Action, dated Jan. 20, 2016, 23 pages.
U.S. Appl. No. 14/498,502, Notice of Allowance, dated Jan. 24, 2019, 16 pages.
U.S. Appl. No. 14/498,502, Non-Final Office Action, dated Jun. 15, 2017, 14 pages.
U.S. Appl. No. 14/498,502, Non-Final Office Action, dated Jun. 28, 2018, 16 pages.
U.S. Appl. No. 14/498,502, Final Office Action, dated Jun. 7, 2016, 31 pages.
U.S. Appl. No. 14/498,502, Final Office Action, dated Mar. 21, 2017, 15 pages.
U.S. Appl. No. 14/498,502, Non-Final Office Action, dated Nov. 10, 2016, 20 pages.
U.S. Appl. No. 14/498,502, Final Office Action, dated Nov. 28, 2017, 13 pages.
U.S. Appl. No. 15/241,361, Non-Final Office Action, dated Dec. 1, 2017, 16 pages.
U.S. Appl. No. 15/241,361, Non-Final Office Action, dated Jun. 2, 2017, 20 pages.
U.S. Appl. No. 15/241,361, Notice of Allowance, dated Mar. 13, 2018, 6 pages.
U.S. Appl. No. 15/241,361, Notice of Allowance, dated Oct. 5, 2017, 14 pages.
3GPP TS 36.212, "LTE; Evolved Universal Terrestrial Radio Access (E-UTRA); Multiplexing and channel coding (Release 11)", V11.3.0, Jul. 2013, 86 pages.
3GPP TS 36.213, "3rd Generation Partnership Project; Technical Specification Group Radio Access Network; Evolved Universal Terrestrial Radio Access (E-UTRA); Physical layer procedures (Release 11)", V11.5.0, Dec. 2013, 182 pages.
3GPP TS 36.213, "3rd Generation Partnership Project; Technical Specification Group Radio Access Network; Evolved Universal Terrestrial Radio Access (E-UTRA); Physical layer procedures (Release 12)", V12.0.0, Dec. 2013, 186 pages.
3GPP TS 36.213, "Evolved Universal Terrestrial Radio Access (E-UTRA); Physical layer procedures (Release 11)", V11.4.0, Oct. 2013, 184 pages.
3GPP TS 36.213, "LTE; Evolved Universal Terrestrial Radio Access (E-UTRA); Physical layer procedures (Release 10)", V10.10.0, Jul. 2013, 129 pages.
3GPP TS 36.306, "Evolved Universal Terrestrial Radio Access (E-UTRA); User Equipment (UE) radio access capabilities (Release 11)", V11.4.0, Sep. 2013, 29 pages.
3GPP TS 36.331, "LTE; Evolved Universal Terrestrial Radio Access (E-UTRA); Radio Resource Control (RRC) Protocol specification (Release 11)", V11.5.0, Sep. 2013, 351 pages.
Ericsson, "On standard impacts to support 256QAM in downlink", R1-135655, 3GPP TSG RAN WG1 Meeting #75, San Francisco, United States, Nov. 11-15, 2013, 3 pages.

(56) References Cited

OTHER PUBLICATIONS

HTC, "On Small Cell Enhancement for Improved Spectral Efficiency", R1-130311, 3GPP TSG RAN WG1 Meeting #72, St Julian's, Malta, Jan. 28-Feb. 1, 2013, 4 pages.
Panasonic, "Discussion on 256QAM for Downlink in Small Cell Deployments", R1-131328, 3GPP TSG-RAN WG1 Meeting 72bis, Chicago, Illinois, USA, Agenda Item 7.2.5.2.3, Apr. 15-19, 2013, 6 pages.
PCT/US2015/010271, International Search Report and Written Opinion, dated Apr. 28, 2015, 15 pages.
PCT/US2015/010358, International Search Report and Written Opinion, dated Apr. 20, 2015, 16 pages.
Qualcomm, "New UE categories", RP-131162, 3GPP TSG-RAN meeting #61, Porto, Portugal, Sep. 3-6, 2013, 3 pages.
Samsung, "Discussion on specification impacts of 256QAM", R1-135208, 3GPP TSG RAN WG1 Meeting #75, San Francisco, United States, Nov. 11-15, 2013, 3 pages.
U.S. Appl. No. 14/498,502, Non-Final Office Action, dated Dec. 31, 2019, 17 pages.
U.S. Appl. No. 14/498,502, Final Office Action, dated Jul. 21, 2020, 19 pages.
U.S. Appl. No. 16/457,367, Final Office Action, 23 pages, dated Jul. 20, 2020.

\* cited by examiner

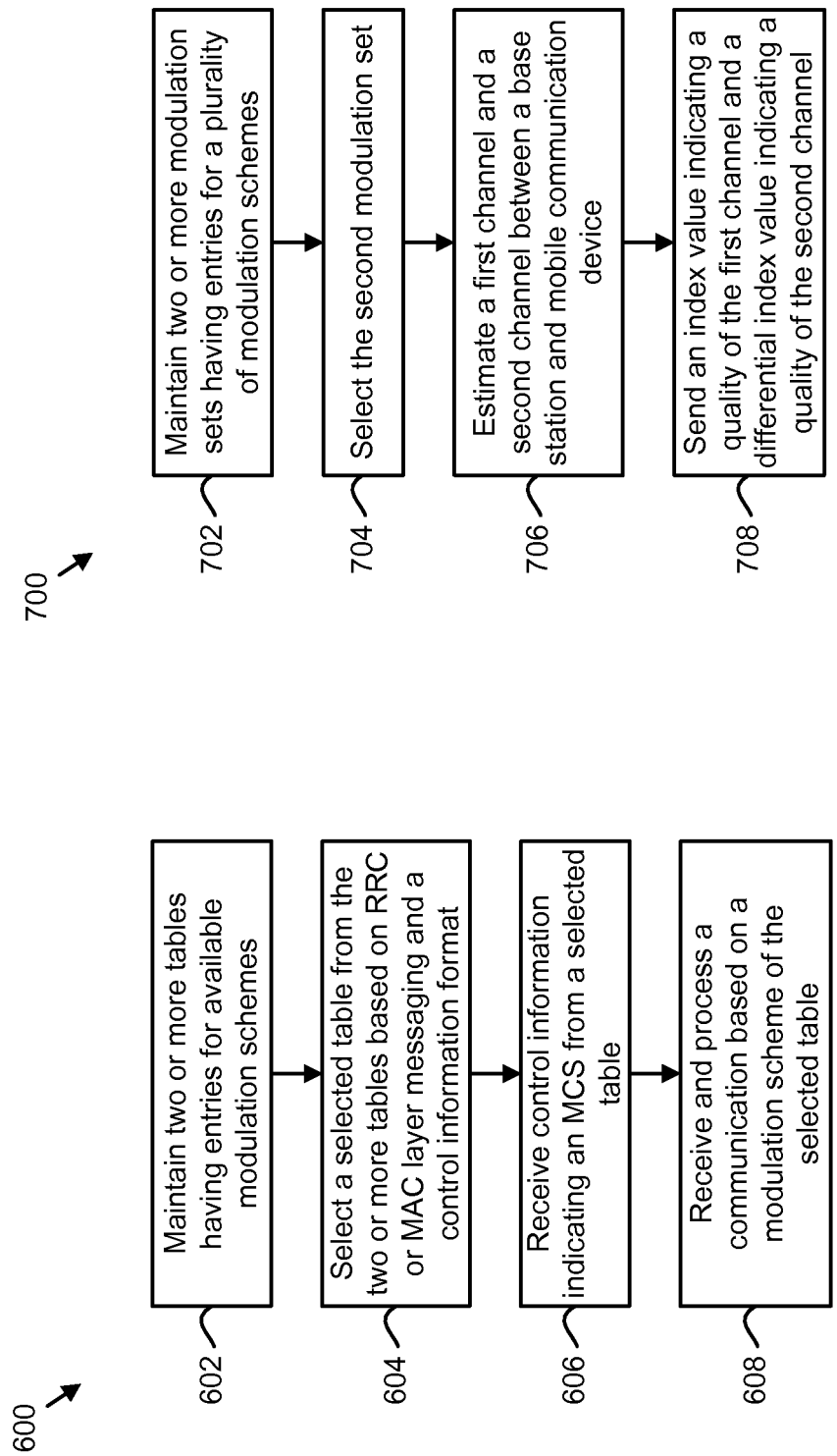

SYSTEMS AND METHODS FOR MODULATION AND CODING SCHEME SELECTION AND CONFIGURATION

RELATED APPLICATION

This application claims the benefit under 35 U.S.C. § 119(e) of U.S. Provisional Application No. 61/924,194, filed Jan. 6, 2014, which is hereby incorporated by reference herein in its entirety.

TECHNICAL FIELD

The present disclosure relates to selecting and configuring a modulation and coding scheme for communication on a mobile network.

BRIEF DESCRIPTION OF THE DRAWINGS

FIG. 6 is schematic flow chart diagram illustrating a method for configuring a modulation and coding scheme for wireless communication.

FIG. 7 is schematic flow chart diagram illustrating a method for channel quality indication.

DETAILED DESCRIPTION OF PREFERRED EMBODIMENTS

Figure 1:
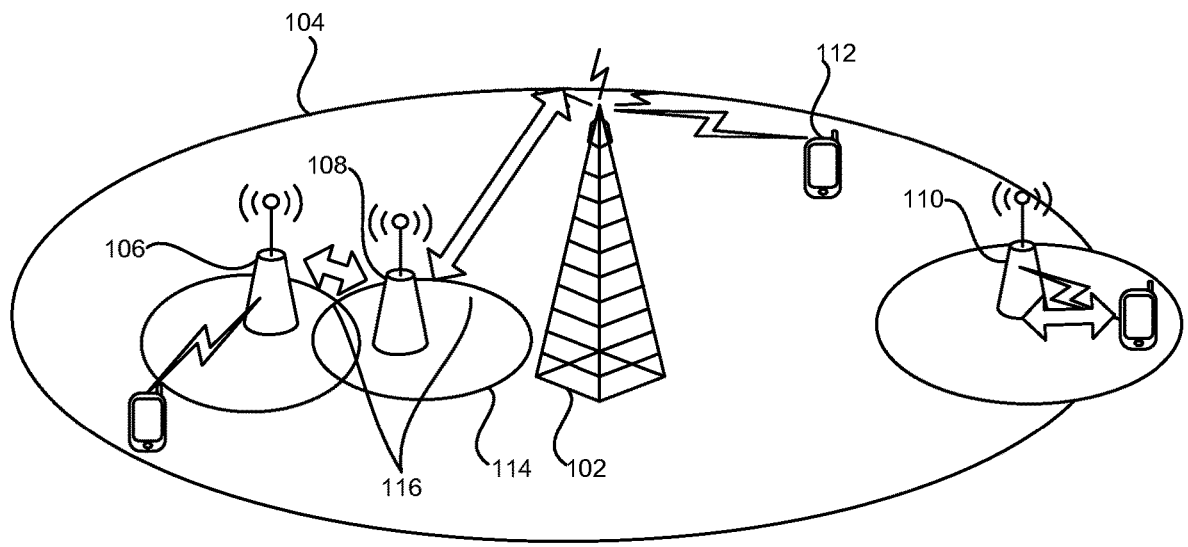
FIG. 1 is a schematic diagram illustrating an example system for wireless communication.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for the purpose of clarity, certain technical material that is known in the related art has not been described in detail in order to avoid unnecessarily obscuring the disclosure.

Wireless mobile communication technology uses various standards and protocols to transmit data between a node (e.g., a transmission station or a transceiver node) and a wireless device (e.g., a mobile communication device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE) Rel. 8, 9 and 10; the Institute of Electrical and Electronics Engineers (IEEE) 802.16 standard (e.g., 802.16e, 802.16m), which is commonly known to industry groups as WiMAX (Worldwide interoperability for Microwave Access); and the IEEE 802.11-2012 standard, which is commonly known to industry groups as WiFi.

In a 3GPP radio access network (RAN) LTE system, the node may be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The DL transmission may be a communication from the node (e.g., eNB) to the wireless device (e.g., UE), and the UL transmission may be a communication from the wireless device to the node.

In homogeneous networks, the node, also called a macro node or macro cell, may provide basic wireless coverage to wireless devices in a cell. The cell may be the area in which the wireless devices are operable to communicate with the macro node. Heterogeneous networks (HetNets) may be used to handle the increased traffic loads on the macro nodes due to increased usage and functionality of wireless devices. HetNets may include a layer of planned high power macro nodes (macro-eNBs or macro cells) overlaid with layers of lower power nodes (small cells, small-eNBs, micro-eNBs, pico-eNBs, femto-eNBs, or home eNBs [HeNBs]) that may be deployed in a less well-planned or even entirely uncoordinated manner within the coverage area (cell) of a macro node. The lower power nodes may generally be referred to as "small cells," small nodes, or low power nodes.

In addition to increasing coverage and/or load capacity, the proximity to a node and favorable geometry experienced by UEs in some small cell deployments provide the possibility for using higher order modulation (HOM) schemes for the DL transmission. For example, current modulation schemes in 3GPP peak at 64 quadrature amplitude modulation (QAM) while the improved proximity and geometry may allow for 256 QAM. However, support of the additional modulation scheme may, in some proposals, include changes in the downlink control signaling formats for indicating a modulation and coding scheme (MCS) with 256 QAM as well as a modification in uplink control information (UCI) signaling formats for reporting a channel quality indicator (CQI) for a link quality corresponding to 256 QAM. In some cases straightforward extension of the existing signaling by adding additional bits in the corresponding fields of the downlink and uplink control information is not desirable, due to additional signaling overhead and potential negative impact on the uplink coverage for some of the uplink control messages (e.g., Physical Uplink Control Channel [PUCCH]).

A wireless communication system can significantly improve its performance, such as increase throughput and reduce packet transmission delay, by adapting an MCS according to current channel condition. For example, the MCS may take a signal-to-noise ratio (SNR) or signal-to-interference-plus-noise ratio (SINR) into account when determining which MCS to use. The adaptive selection of MCS is often referred to as adaptive modulation and coding (AMC).

Currently in LTE, a UE estimates a current channel condition and selects a CQI value corresponding to the current condition. A four-bit CQI table that contains 16 MCSs is defined in the specification in Table 7.2.3-1 of 3GPP TS 36.213. The UE selects one MCS out of the 16

MCSs that is considered to be the most suitable (or maximally supportable) to the current downlink channel condition. The UE provides the selected CQI value to the eNB which corresponds to the selected MCS. The CQI indices for each of the 16 MCSs are defined in the CQI table.

The eNB then uses the CQI index for MCS selection for a communication, such as a physical downlink shared channel (PDSCH) transmission. The eNB selects an MCS from an MCS table defined in Table 7.1.7.1-1 of 3GPP TS 36.213. An MCS index (IMCS) corresponding to the selected MCS is communicated to the UE on a physical downlink control channel (PDCCH) and uses the MCS for the corresponding communication(s). The UE uses the value $I_{MCS}$ received in the downlink control information (DCI) format in conjunction with the table coded into the specification (specifically Table 7.1.7.1-1) to determine the modulation order ($Q_m$) and transport block size (TBS) used in the PDSCH. The UE can then receive and decode the PDSCH based on the determined modulation order and transport block size.

As mentioned above, deployment of small cells is expected to improve the capacity of the LTE system due to cell splitting gains and allow for HOM, e.g., 256 QAM for the PDSCH. However, the current (or legacy) CQI table (Table 7.2.3-1) and the current (or legacy) MCS table (7.1.7.1-1) support only up to 64 QAM. Therefore, a new CQI table and a new MCS table need to be defined to support higher MCSs with 256 QAM in a new version of LTE specification. As used herein the terms "HOM-CQI table" and "HOM-MCS table" may be used to reference new or enhanced tables that support 256 QAM. Note that modification of the current CQI table and the current MCS table may inhibit operation of legacy UEs and legacy eNBs that are not aware of the existence of the HOM-CQI table and the HOM-MCS table.

Based on the foregoing, and in light of the present disclosure, it can be seen that straightforward extension of the existing MCS and CQI tables with additional entries corresponding to 256 QAM would require an additional bit for each of the $I_{MCS}$ and CQI parameters. However, this change would necessitate changes in the downlink and uplink control signaling formats. In the present disclosure, we propose various methods for enabling and/or configuring 256-QAM signaling between a base station and UE. In one embodiment, the sizes of the tables used for indicating $I_{MCS}$ and CQI are maintained so that there is no need to define new DCI format and CQI reporting. In one embodiment, two sets of CQI tables and MCS tables are defined.

In one embodiment, a UE includes a table component, a table selection component, a control information component, and a communication component. The table component is configured to maintain two or more tables each having entries for a plurality of available modulation schemes. The two or more tables may include a default table (such as a legacy CQI table or MCS table) and a secondary table (such as an HOM-CQI table or an HOM-MCS table), wherein the default table and the secondary table have a same number of entries. The secondary table may include an entry corresponding to a 256 QAM scheme. The table selection component is configured to select a selected table from one of the default table and the secondary table. The table selection component uses the default table as a default and selects the secondary table in response to messaging from an eNB indicating selection of the secondary table, such as via radio resource control (RRC) layer signaling or medium access control (MAC) layer signaling. The table selection component is further configured to select the default table based on a control information format for control information received from the eNB. The control information component configured to receive control information indicating an MCS from the selected table and the communication component is configured to receive and process a communication from the eNB based on the MCS from the selected table.

In some embodiments, the present disclosure allows a UE or an eNB to support an entire range of modulation schemes (from QPSK to 256 QAM) without any changes in the signaling format for downlink and uplink control channels (i.e., no new DCI and UCI formats). Furthermore, proposed embodiments provide an efficient switching mechanism between legacy and HOM tables depending on the downlink channel condition. For example, they are robust to the situations where the channel condition of a UE becomes suddenly bad. In one embodiment, a proposed MCS indexing method provides an eNB with more flexibility in choosing MCSs for a PDSCH transmissions and eliminates a potential mismatch of tables during an RRC or MCS ambiguity period. In one embodiment, the differential CQI reports are allowed based on disclosed indexing rules for the HOM-CQI table. Furthermore, one embodiment allows use of a maximum soft buffer memory size of a UE configured for HOM, which may improve performance through additional coding gains.

As used herein, the terms "node" and "cell" are both intended to be synonymous and refer to a wireless transmission point operable to communicate with multiple UE, such as an eNB, a low power node, or other base station.

FIG. 1 is a schematic diagram illustrating nodes in a RAN. The RAN includes an eNB 102 that provides wireless communication services within a macro cell coverage area 104. Within the macro cell coverage area 104 are two small cells 106, 108 which may be used to improve capacity in high use areas by allowing the macro cell to offload to the small cells 106, 108. Another small cell 110 is illustrated as existing on the edge of the coverage area 104. The small cells 106, 108, and 110 provide coverage in small cell coverage areas 114 which may be used to fill coverage holes within the macro cell coverage area 104 and at the edge of the boundaries between the macro cell coverage area 104, as shown in FIG. 1. The eNB 102 and small cells 106, 108, and 110 provide communication services to one or more UEs 112. In one embodiment, the eNB 102 and small cells 106, 108, and 110 coordinate communications, handovers, and other communication services as indicated by arrows 116.

While three small cells 106, 108, 110 are illustrated within the macro cell coverage area 104 of the eNB 102, a macro cell's coverage area may include hundreds of small nodes. For example, small nodes configured as HeNBs may be located in hundreds of homes that are within the coverage area of a single macro node. Similarly, within one RAN there may be a mixture of sparse and dense small cell deployments. In one embodiment, one or more of the small cells 106, 108, 110 is deployed independently of a macro node. Similarly, one or more of the small cells may be positioned such that there is no overlap with the macro node's coverage area 104.

According to one embodiment, the eNB 102 or other controllers for the macro cell and small cells 106, 108, and 110 are configured to vary an MCS used to communicate with the UEs 112. For example, an MCS used to communicate with a specific UE 112 may vary based on a current channel quality. As discussed above, due to reduced distances and improved geometry, UEs 112 may be capable of communicating using HOM schemes within small cells than within the macro cell. In one embodiment, the UE 112 and eNB 102 (or other RNC) maintains or configures alternate tables for selecting or indicating an MCS. For example, the eNB 102 may send a message to a UE 112 configuring a new table to be used in place of a legacy table. The new table may include an MCS that has a higher spectral efficiency than the legacy table. The UE 112 may determine which table to use for sending CQIs and for interpreting an indication of which MCS to use to process received communications. More detailed operation and examples will be discussed in relation to the remaining figures.

Figure 2:
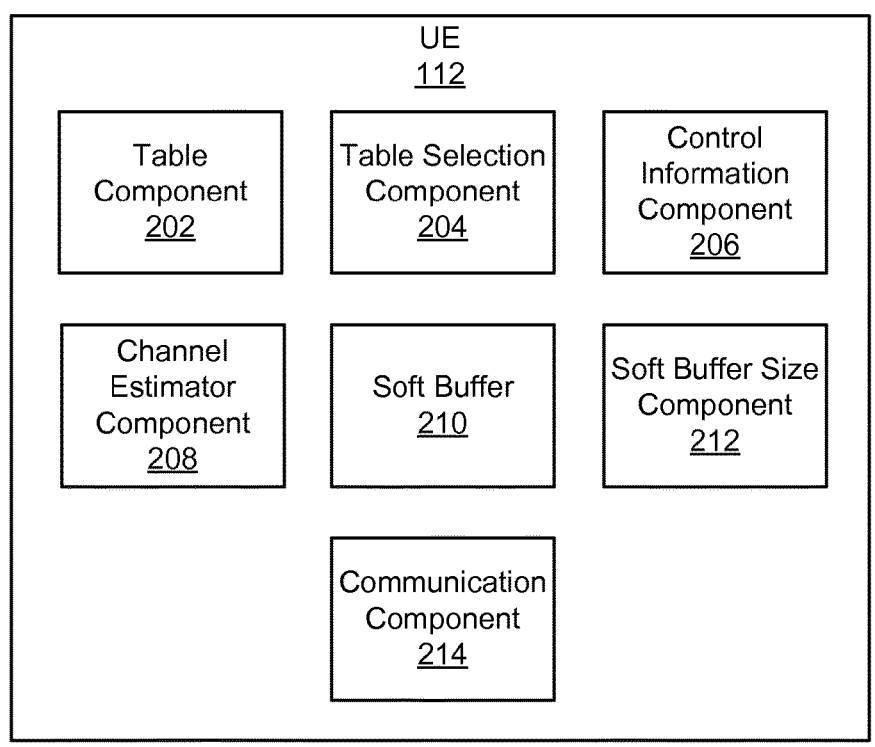
FIG. 2 is a schematic block diagram of example components of user equipment (UE).

FIG. 2 is a schematic block diagram of one embodiment of a UE 112. The UE 112 includes a table component 202, a table selection component 204, a control information component 206, a channel estimator component 208, a soft buffer 210, a soft buffer size component 212, and a communication component 214. The components 202-214 are given by way of example only and may not all be included in all embodiments. Some embodiments may include any one or any combination of two or more of the components 202-214.

The table component 202 is configured to store or maintain a plurality of tables. In one embodiment, the table component 202 is configured to maintain tables for selection and indication of modulation schemes, coding rates, transport block size, or the like. In one embodiment, the table component 202 maintains two different tables that are used for the same purpose. For example, the table component 202 may store a default table and a secondary table, which can be used in place of the default table. The default table may correspond to a previous version of a communication standard or to modulation schemes that some UEs 112 that use a mobile network are capable of using. For example, multiple types and versions of UEs 112 may be used to access a mobile network, and different types and versions may have different peak data rates or modulation order capabilities. In one embodiment, in a given subframe on a given cell only one of the tables is used for a specific UE. For example, all PDSCHs within a given subframe may be interpreted based on the same table for a specific UE.

Each table may include a plurality of entries for different modulation schemes which can be used by a UE 112 or an eNB 102. In one embodiment, the number of entries in each table matches so that the entries can be used in place of each other. In one embodiment, the number of entries in the secondary table is less than or equal to the number of entries in the default table. In one embodiment, the default table includes schemes that can be used by any attached UE 112 while the secondary table includes higher order modulations or schemes that only certain UEs 112 are capable of utilizing. In one embodiment, the secondary table includes a modulation scheme that has an HOM than any of the schemes in the default table. For example, the maximum modulation order in the default table may be 64 QAM while the highest order modulation in the secondary table may be 256 QAM.

While the present disclosure discusses tables for storing, configuring, and/or selecting modulation schemes, it should be understood that other types of data structures or organization units such as matrices, arrays, or the like may be used. For example, any data structure that includes modulation sets (e.g., a default modulation set and a secondary modulation set) which can be selected for MCS selection and configuration may be used.

In one embodiment, a default table and a secondary table include a number of shared entries. The shared entries may correspond to a same modulation scheme such that at least some modulation schemes are common to both tables. In one embodiment, the shared entries are indexed or arranged such that entries corresponding to the same MCS have the same position or index. Indexing the same MCS the same can help to avoid potential RRC or MCS ambiguity problems, which will be discussed further below. In one embodiment, the secondary table and default table include one or more unshared entries. For example, an entry in the secondary table may correspond to a HOM scheme that is not available from the default table. Similarly, the default table may include a modulation scheme that is not available from the secondary table. The unshared entries may be ordered relative to each other. For example, unshared entries in the default table may be organized in an ascending or descending order in relation to both the unshared entries and the shared entries of the default table. As an example, a CQI value or IMCS value may be the same for same MCS in both tables. In one embodiment, the unshared entries in the secondary table are not in an ascending or descending order with relation to the shared entries, but are ordered in relation to other shared entries. For example, the unshared entries may be organized in an ascending or descending order, or based on any other arbitrary rule, based on a transport block size and/or modulation order in relation to each other.

In one embodiment, the table component 202 stores or maintains an MCS table. The MCS table may include a table used to select a modulation order ($Q_m$) and transport block size (using $I_{TBS}$) based on an MCS index, IMCS. One example of an MCS table includes the modulation and TBS index table for PDSCH (Table 7.1.7.1-1) defined in 3GPP TS 36.213, which was mentioned previously and is reproduced below as Table 1.

TABLE 1

| MCS Index ($I_{MCS}$) | Modulation Order ($Q_m$) | TBS Index ($I_{TBS}$) |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | reserved |
| 31 | 6 | reserved |

It should be noted that Table 1 is indexed and organized in ascending order (from 0 to 31) based on the modulation order ($Q_m$) and the transport block size index (ITBS). In one embodiment, Table 1 is used as the default or legacy table while a new table is used as the enhanced or secondary table. Usage of Table 1 may provide backward compatibility with existing UEs 112 and UEs 112 that operate with current standards. In one embodiment, a secondary table is used to provide modulation schemes that can be used by new UEs 112 and subsequent releases. In one embodiment, the secondary table includes a 256 QAM modulation order ($Q_m=8$). In one embodiment, the total number of entries in each of the default table and the secondary table does not exceed 32 to accommodate indication using $I_{MCS}$ in a five-bit field.

In one embodiment, multiple secondary tables are specified or maintained. For example, any one of the secondary tables may be a candidate for the secondary (or new) table. In one embodiment, an RRC message from the serving cell indicates which table out of the multiple secondary tables should be used as the secondary table. In one embodiment, one of the secondary tables is defined as a default secondary table. The UE 112 may use the default secondary table as the secondary table unless a serving cell or eNB 102 indicates otherwise.

In one embodiment, the secondary table includes an MCS table similar to Table 1 with one or more of the entries (e.g., rows) swapped out for a different configuration. Table 2 illustrates one embodiment of a secondary MCS table that includes shared entries with Table 1 (IMCS values 1, 2, 4, 6, 8, 9, 11-16, 18-26, and 29-31) and unshared entries (IMCS values 1, 3, 5, 7, 10, 17, 27, and 28).

TABLE 2

| MCS Index ($I_{MCS}$) | Modulation Order ($Q_m$) | TBS Index ($I_{TBS}$) |
| --- | --- | --- |
| 0 | 2 | 0 |
| 1 | 8 | 27 |
| 2 | 2 | 2 |
| 3 | 8 | 28 |
| 4 | 2 | 4 |
| 5 | 8 | 29 |
| 6 | 2 | 6 |
| 7 | 8 | 30 |
| 8 | 2 | 8 |
| 9 | 2 | 9 |
| 10 | 8 | 31 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 8 | 32 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 8 | 33 |
| 28 | 8 | reserved |
| 29 | 2 | reserved |
| 30 | 4 | reserved |
| 31 | 6 | reserved |

Table 2 illustrates one embodiment of a secondary or enhanced MCS table where unshared entries are ordered in relation to each other while maintaining the same index for shared entries in relation to Table 1. The unshared entries are out of order with respect to the shared entries but are still organized, in relation to each other, in an ascending order.

Table 3 illustrates one embodiment of a secondary or enhanced MCS table indexed in a conventional manner (e.g., all entries are reordered/arranged based on ascending modulation order and TBS index.

TABLE 3

| MCS Index ($I_{MCS}$) | Modulation Order ($Q_m$) | TBS Index ($I_{TBS}$) |
| --- | --- | --- |
| 0 | 2 | 0 |
| 1 | 2 | 2 |
| 2 | 2 | 4 |
| 3 | 2 | 6 |
| 4 | 2 | 8 |
| 5 | 2 | 9 |
| 6 | 4 | 10 |
| 7 | 4 | 11 |
| 8 | 4 | 12 |
| 9 | 4 | 13 |
| 10 | 4 | 14 |
| 11 | 4 | 15 |
| 12 | 6 | 16 |
| 13 | 6 | 17 |
| 14 | 6 | 18 |
| 15 | 6 | 19 |
| 16 | 6 | 20 |
| 17 | 6 | 21 |
| 18 | 6 | 22 |
| 19 | 6 | 23 |
| 20 | 6 | 24 |
| 21 | 8 | 27 |
| 22 | 8 | 28 |
| 23 | 8 | 29 |
| 24 | 8 | 30 |
| 25 | 8 | 31 |
| 26 | 8 | 32 |
| 27 | 8 | 33 |
| 28 | 8 | reserved |
| 29 | 2 | reserved |
| 30 | 4 | reserved |
| 31 | 6 | reserved |

It is important to note that at least some entries in Table 3 correspond to the same MCS entries as in Table 1, but have a different IMCS value.

In one embodiment, the default table and the secondary table each include a CQI table. The CQI table may include a table used to indicate a modulation preferred by the UE 112 and a coding rate preferred by the UE 112 based on a CQI index. One example of a CQI table includes Table 7.2.3-1 defined in 3GPP TS 36.213, which is reproduced in Table 4 below.

TABLE 4

| CQI Index | Modulation | Code Rate x 1024 | Efficiency |
| --- | --- | --- | --- |
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9144 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

Any of the examples or principles discussed above in relation to the $I_{MCS}$ table may be used in relation to the CQI table for channel state information reporting. For example, a UE 112 supporting 256 QAM may be configured with two CQI mapping tables, where some of the entries in two tables are different and at least one table should include CQI values corresponding to the 256 QAM modulation order. The total number of entries in each of the configured tables may not exceed 16 to accommodate the maximum length of a four-bit CQI report. For a given CQI report, only one CQI table is used. In one embodiment, a plurality of secondary CQI tables are specified or maintained. Similar to an embodiment with multiple $I_{MCS}$ tables, an RRC message may indicate which table out of the multiple secondary CQI tables is used as the secondary table. Furthermore, one secondary CQI table can be specified as the default secondary CQI table. The default secondary CQI table may be used unless RRC signaling changes the secondary table to be a different secondary CQI table. With regard to indexing, the secondary CQI table may include one or more shared entries with a same CQI value as in Table 1 with some unshared entries. Once again, the unshared entries may be organized in an arbitrary manner with respect to each other. One embodiment of a secondary CQI table is shown below in Table 5.

TABLE 5

| CQI Index | Modulation | Code Rate × 1024 | Efficiency |
|---|---|---|---|
| 0 | | out of range | |
| 1 | QPSK | 78 | 0.1523 |
| 2 | 256 QAM | 711 | 5.5547 |
| 3 | QPSK | 193 | 0.3770 |
| 4 | 256 QAM | 778 | 6.0781 |
| 5 | QPSK | 449 | 0.8770 |
| 6 | 256 QAM | 860 | 6.7188 |
| 7 | 16 QAM | 378 | 1.4766 |
| 8 | 16 QAM | 490 | 1.9144 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 256 QAM | 942 | 7.3594 |

Table 5 illustrates one embodiment of a secondary or enhanced CQI table where unshared entries are ordered in relation to each other while maintaining the same index for shared entries in relation to Table 4. The unshared entries are out of order with respect to the shared entries but are still organized, in relation to each other, in an ascending order. Table 6 illustrates one embodiment of a secondary or enhanced MCS table indexed in a conventional manner (e.g., all entries are reordered/arranged based on ascending modulation order and efficiency).

TABLE 6

| CQI Index | Modulation | Code Rate × 1024 | Efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16 QAM | 378 | 1.4766 |
| 5 | 16 QAM | 490 | 1.9144 |
| 6 | 16 QAM | 616 | 2.4063 |
| 7 | 64 QAM | 466 | 2.7305 |
| 8 | 64 QAM | 567 | 3.3223 |
| 9 | 64 QAM | 666 | 3.9023 |
| 10 | 64 QAM | 772 | 4.5234 |
| 11 | 64 QAM | 873 | 5.1152 |
| 12 | 256 QAM | 711 | 5.5547 |
| 13 | 256 QAM | 778 | 6.0781 |
| 14 | 256 QAM | 860 | 6.7188 |
| 15 | 256 QAM | 942 | 7.3594 |

It is important to note that at least some entries in Table 6 correspond to the same CQI entries as in Table 4, but have a different CQI value.

In one embodiment, the table component 202 maintains default and secondary tables for both MCS tables and CQI tables. For example, the table component 202 may store a secondary MCS table which may be selectively used in place of a default MCS table and may also store a secondary CQI table which may be used in place of a default CQI table.

The table component 202 may store tables that include predefined tables. For example, the default table and secondary table may be defined within a corresponding standard, such as a release of LTE. The table component 202 may store the tables such that a service cell and UE 112 know which tables are available and can use minimal signaling to configure which table is needed for use. In one embodiment, the table component 202 maintains the tables by receiving messaging to configure one or more of the default table and the secondary table. For example, the UE 112, or table component 202, may receive a table configuration message from a base station, such as a small cell, defining at least a portion of the secondary table or the default table. The configuration message may indicate a higher modulation scheme for at least one entry which may allow the UE 112 to communicate using the HOM. In one embodiment, the configuration message indicates one or more entries to be changed in the secondary table over the default table. For example, the secondary table may be the same as the default table except that some entries in the secondary table are different from corresponding entries in the default table. The table component 202 may maintain the tables by modifying any tables based on the table configuration message.

In one embodiment, two MCS tables are hard coded in the specification, where the first table is the same as Table 7.1.7.1-1 of TS 36.213 with QPSK, 16-QAM, and 64-QAM modulation entries and the second table has one or more entries corresponding to QPSK modulation (or other modulations) in the first table removed with 256-QAM modulation entries in their place. In another embodiment, two $I_{MCS}$ tables are configured by RRC signaling (e.g., by using a bitmap), where the entries for each table is explicitly configured (e.g., each element in a bitmap indicates the activated MCS and TBS for a given entry of a table). In another embodiment, two MCS tables are hard coded in the specification and an eNB 102 can reconfigure at least one of the first and the second MCS tables through MAC or RRC signaling, if needed.

Similarly, two CQI tables may also be hard coded in the specification, where the first table is the same as Table 7.1.7.1-1 of TS 36.213 with QPSK, 16-QAM, and 64-QAM modulation entries and the second table has one or more entries corresponding to QPSK modulation (or other modulations) in the first table removed with 256-QAM modulation entries in their place. In another embodiment, two CQI tables are configured by RRC signaling (e.g., by using a bitmap), where the entries for each table are explicitly configured (e.g., each element in bitmap indicates the activated MCS and TBS for a given table). In another embodiment, two CQI tables are hard coded in the specification and an eNB 102 can reconfigure at least one of the first and the second CQI tables through MAC/RRC signaling, if needed.

The table selection component 204 is configured to select which of the default table and the secondary table (or a default modulation set or secondary modulation set) to use for a specific communication. If a new HOM-CQI table and/or a new HOM-MCS table are defined in addition to the legacy CQI table and the legacy MCS table, the UE 112 or eNB 102 may need an efficient mechanism to indicate which CQI table and which MCS table are used (or active) at a given time to allow for successful packet transmission/reception with an appropriate AMC. For example, the table selection component 204 is configured to determine a selected table from the default table and the secondary table. In one embodiment, the table selection component 204 selects one of a default MCS table and a secondary MCS table and the table selection component 204 also selects one of a default CQI table and a secondary CQI table. In one embodiment, the table selection component 204 is configured to select the selected table in response to the UE 112 receiving one or more of an RRC layer message and a MAC layer message indicating the selected table. For example, the higher layer message may include an explicit indication regarding which of a default table or a secondary table should be used for PDSCH communications. In one embodiment, the RRC layer message includes a value that indicates which table is to be used.

In one embodiment, the table selection component 204 selects the default table based on a control information format for control information received from an eNB 102. For example, the UE 112 may receive a PDCCH with control information to configure receipt of a PDSCH. The table selection component 204 may select the default table if the format is DCI format 1A, regardless of an RRC or MAC layer signaling. For example, the table selection component 204 may select a default MCS table even if RRC or MAC layer signaling indicates that secondary CQI or MCS tables should be used. In one embodiment, if the DCI format comprises any other format, the table selection component 204 uses the secondary tables, if indicated by RRC or MAC layer signaling. In one embodiment, after a handoff of a UE 112 (i.e., a change of the UE 112 serving cell from the current serving cell to another cell), the default or legacy CQI table is used unless RRC/MAC signaling indicates that the second table is used after the handoff. For example, the table selection component 204 may use the default table(s) upon power on, cell connection, or handover unless or until an indication is received to use the secondary table(s).

Figure 4:
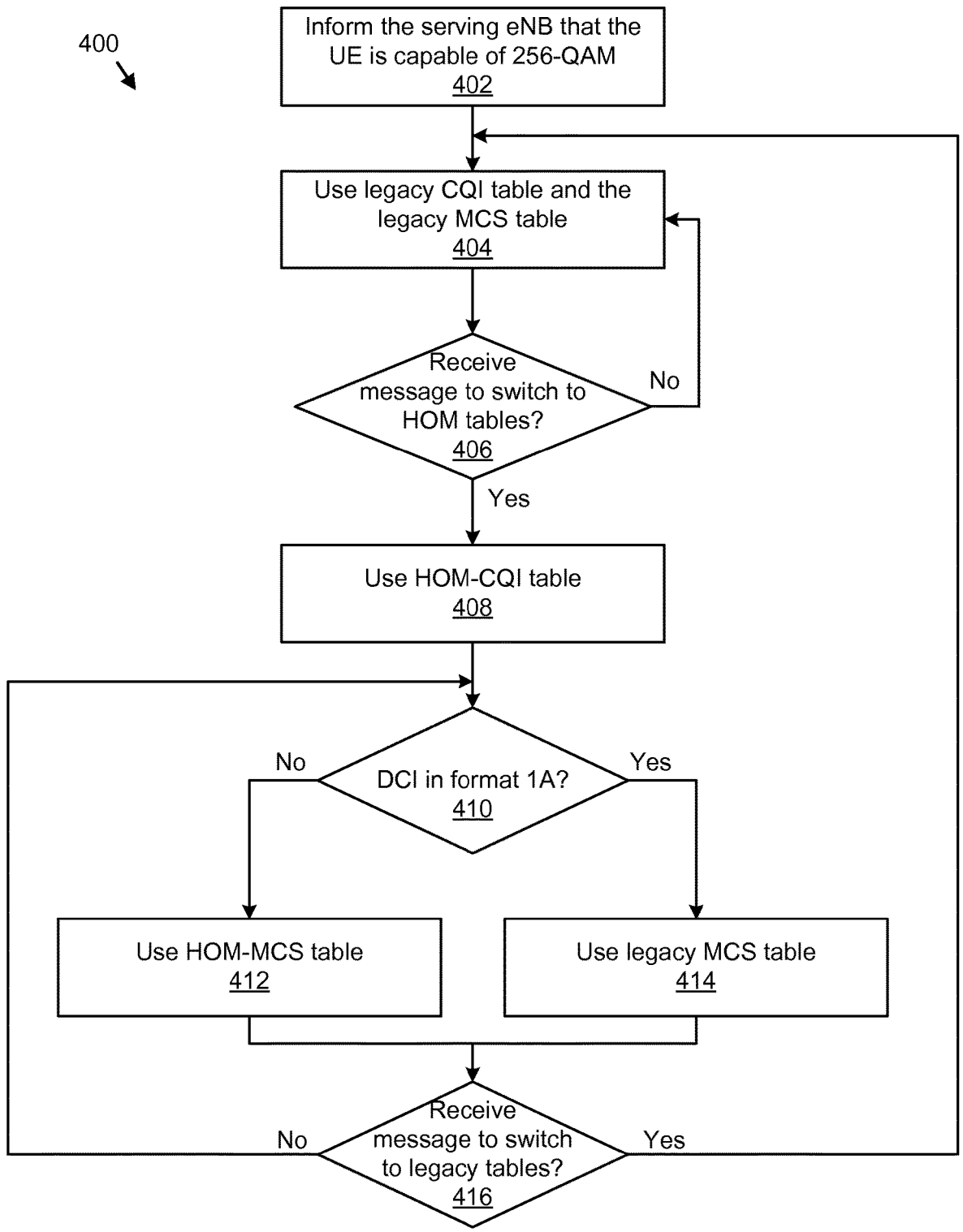
FIG. 4 is a schematic block diagram illustrating an ambiguity period.

FIG. 4 is a schematic block diagram illustrating one embodiment of a method 400 for selecting a table or modulation set for AMC. The method 400 may be performed by a wireless communication device, such as the UE 112 of FIG. 2.

The method 400 begins and the UE 112 informs 402 a serving eNB 102 that the UE 112 is capable of 256 QAM. The UE 112 may inform 402 the serving eNB 102 of the capability via RRC layer signaling, MAC layer signaling, UCI, or the like. In one embodiment, the UE 112 informs 402 the serving eNB 102 indirectly of its capability by indicating a release version (e.g., Rel. 13), or in any other manner.

The table selection component 204 uses 404 a legacy CQI table and a legacy MCS table. For example, the table selection component 204 may default to using 404 legacy tables (i.e., default tables) upon power up, cell connection, or handover. The table selection component 204 determines whether a message to switch to HOM tables has been received 406. For example, if the serving eNB 102 is capable of 256 QAM and it has decided to switch one or both of the CQI and MCS tables from the legacy to the HOM tables due to detection that the channel is good enough to support 256 QAM based on a UE 112 measurement report (e.g., received signal received power [RSRP], reference signal received quality [RSRQ], and/or CQI reports), the eNB 102 sends to the UE 112 one or more RRC or MCS layer signals requesting the UE 112 to switch to the HOM table(s). If the message to use an HOM table has not been received (NO at 406), the table selection component 204 continues to use 404 the legacy tables. If the message to use an HOM table has been received (YES at 406), the table selection component 204 uses 408 an HOM-CQI table.

If use of HOM tables (i.e., secondary tables or enhanced tables) has been configured, such as at 406 or 408, the table selection component 204 determines 410 whether DCI is received in format 1A. If the DCI format is not format 1A (NO at 410), the table selection component 204 uses 412 an HOM-MCS table to receive/decode a corresponding PDSCH. If the DCI format is format 1A (YES at 410), the table selection component 204 uses 414 a legacy MCS table to receive/decode the corresponding PDSCH. For example, even though the HOM-MCS table is active, the legacy MCS table is used for PDSCH transmissions associated with DCI format 1A. In one embodiment, the DCI format 1A is used due to a reduced channel quality and thus 256 QAM may not be available and thus a lower modulation scheme may be used.

The table selection component 204 determines whether a message to switch to legacy tables has been received 416. If the message to use a legacy table has not been received (NO at 416), the table selection component 204 returns to decision 410 to determine 410 a format of a received DCI. If the message to use a legacy table has been received (YES at 416), the table selection component 204 uses 404 a legacy CQI table and a legacy MCS table. For example, if HOM-CQI table and/or the HOM-MCS table are currently active and the eNB 102 has decided to switch from the HOM tables to the legacy table(s), the eNB 102 sends to the UE 112 one or more RRC or MCS layer signals requesting the UE 112 to switch to the legacy table(s).

In one embodiment, the table selection component 204 automatically falls back to the legacy tables after handover, unless one or both of the current serving eNB and the target eNB indicate that the HOM tables are used in the target cell.

The control information component 206 is configured to receive messages or signaling from an eNB 102 indicating which tables to use or otherwise configure operation or an AMC of the UE 112. In one embodiment, the control information component is configured DCI indicating how to receive a corresponding PDSCH. In one embodiment, the control information component 206 receives and processes an RRC or MAC layer message indicating which table of a default table and a secondary table to use.

The channel estimator component 208 is configured to estimate a first channel and second channel between the UE 112 and the eNB 102. The CQI is configured to determine and send to the eNB 102 an index value (i.e., CQI value) indicating a quality of the first channel. For example, the CQI value may indicate an MCS that the UE 112 has determined would be supported by the current SNR or SINR of the first channel. In one embodiment, the channel estimator component 208 is further configured to determine and send a differential index value indicating a quality of the second channel. The differential index value may include an offset value indicating an offset for the second channel in relation to the first channel. For example, the differential index value may include a value based on the second table arranged in order according to one or more of a modulation value and a transport block size index in the selected table. In one embodiment, the secondary CQI table includes a differential CQI index that corresponds to an index if the table were ordered according to a modulation order and/or an efficiency. In one embodiment, the first and second channels include different spatial streams. For example, the first channel may correspond to a channel orthogonal in time, space, or frequency from the second channel. In one embodiment, the first channel corresponds to a wide frequency band and the second channel corresponds to a sub-frequency band of the wide frequency band.

As discussed above, each entry (or row) in a CQI table may indicate a specific MCS. Thus, the CQI index value is often referred to as an absolute CQI value. In some situations, multiple CQI values are reported from a UE 112 and are supported by LTE to reduce signaling overhead. For example, a channel quality report may include CQI reports for multiple spatial streams or a CQI report for a particular sub-band on top of a wide-band CQI. However, when the CQI entries are not indexed in ascending order (compare Table 5 in which they are not in ascending order with Table 6 wherein they are in ascending order), a conventional offset value would not work. In one embodiment, to overcome this problem, the differential CQI is defined based on the MCS levels in ascending order, rather than based on the CQI index values. In other words, the differential CQI is defined as if the CQI indices were rearranged in ascending order, in one embodiment. Table 7 illustrates a secondary CQI table that includes an additional column corresponding to a differential CQI index.

TABLE 7

| CQI Index | Differential CQI Index | Modulation | Code Rate × 1024 | Efficiency |
|---|---|---|---|---|
| 0 | 0 | | out of range | |
| 1 | 1 | QPSK | 78 | 0.1523 |
| 2 | 12 | 256 QAM | 711 | 5.5547 |
| 3 | 2 | QPSK | 193 | 0.3770 |
| 4 | 13 | 256 QAM | 778 | 6.0781 |
| 5 | 3 | QPSK | 449 | 0.8770 |
| 6 | 14 | 256 QAM | 860 | 6.7188 |
| 7 | 4 | 16 QAM | 378 | 1.4766 |
| 8 | 5 | 16 QAM | 490 | 1.9144 |
| 9 | 6 | 16 QAM | 616 | 2.4063 |
| 10 | 7 | 64 QAM | 466 | 2.7305 |
| 11 | 8 | 64 QAM | 567 | 3.3223 |
| 12 | 9 | 64 QAM | 666 | 3.9023 |
| 13 | 10 | 64 QAM | 772 | 4.5234 |
| 14 | 11 | 64 QAM | 873 | 5.1152 |
| 15 | 15 | 256 QAM | 942 | 7.3594 |

As can be seen in Table 7, the differential CQI index, which is based on MCS level, is different from the CQI index (or absolute CQI index). Thus, a CQI value for the first channel may include the absolute CQI index while a differential CQI value may indicate an offset from the absolute CQI index value to the MCS for the second channel.

An example index value and differential index value may be illustrated with respect to an example of spatial multiplexing transmission, where an absolute CQI is reported for codeword 0 and a relative CQI is reported for codeword 1. According to one embodiment, the offset level that defines a difference between the absolute CQI and the differential CQI (DCQI) is computed as: offset level=DCQI index for codeword 0−DCQI index for codeword 1, where DCQI index is the index corresponding to the second column of Table 7. For example, the UE 112 may want to report to the eNB 102 an MCS for 256 QAM with code rate 860/1024 (corresponding to absolute CQI index 6 and DCQI index 14 in Table 7) and an MCS for 256 QAM with code rate 711/1024 (corresponding to absolute CQI index 2 and DCQI index 12 in Table 7) are supportable for codeword 0 and codeword 1, respectively. Then, the offset level becomes 2 in this particular example, since the offset level is computed as: offset level=14−12=2, where 14 is the DCQI index corresponding to CQI index 6 and 12 is the DCQI index corresponding to CQI index 2. Therefore, the UE sends CQI index 6 along with DCQI value (in Table 8) 2, where CQI index 6 is for codeword 0 and DCQI value 2 is for codeword 1. The eNB 102 has to interpret the CQI index and DCQI value accordingly to figure out the maximally supportable MCS levels for codeword 0 and codeword 1.

TABLE 8

| DCQI Value | Offset Level |
|---|---|
| 0 | 0 |
| 1 | 1 |
| 2 | 2 |
| 3 | ≥3 |
| 4 | ≤−4 |
| 5 | −3 |
| 6 | −2 |
| 7 | −1 |

The soft buffer 210 may include memory for storage of received encoded bits. In one embodiment, the soft buffer 210 includes a size that is sufficient to handle at least 256-QAM peak data rates. For example, LTE uses incremental redundancy hybrid automatic repeat request (HARM). For example, a UE 112 usually stores received coded bits in the soft buffer 210. During retransmission, the UE 112 combines the newly received bits with the previously received and stored bits to improve reliability in the accuracy of the received encoded data. Generally, the soft buffer size depends on the peak data rate in that a greater peak data rate generally needs a soft buffer size that is bigger than when a peak data rate is smaller. Thus, with introduction of 256 QAM the peak data rate will be increased and the soft buffer size may also need to be increased. Thus, the UE 112 may have a soft buffer 210 having a greater size than other legacy UEs 112 (e.g., UEs from previous releases of LTE). Thus, in one embodiment, the soft buffer 210 includes a size that is sufficient to handle at least 256-QAM peak data rates.

The soft buffer size component 212 is configured to determine an amount of the soft buffer 210 that should be used for a specific communication. For example, the soft buffer size component 212 may be configured to use a soft buffer size less than the 256-QAM soft buffer size until an indication from the eNB 102 to use the 256-QAM soft buffer size is received. In one embodiment, the indication to use the HOM buffer size is sent via RRC or MAC layer signaling.

The mother code rate of the LTE turbo codes is one-third, which indicates that the turbo encoder produces 3×N coded bits, where N is the number of input bits (or payload size) to the encoder. Each HARQ transmission (e.g., first transmission, second transmission, etc.) conveys all or part of the 3×N coded bits according to the rules defined in the relevant LTE specifications (e.g., 3GP TS 36.212 and 3GP TS 36.213). To be more specific, a subset of the 3×N coded bits is defined and each HARQ transmission selects a part or all of the coded bits within the subset. This subset is referred to as the soft buffer and its size is referred to as the soft buffer size.

Although the soft buffer size of 3×N is desirable to achieve as much coding gains as possible, the soft buffer size is sometimes less than 3×N for when the UE 112 cannot support the soft buffer size of 3×N due to a limited memory capability (insufficient soft buffer size). In general, a 256-QAM capable UE 112 has a larger memory capability than legacy UEs 112 that do not support the 256-QAM feature. Therefore, a larger soft buffer size could be used for the UE 112 with 256 QAM. Use of the larger buffer size can improve performance, even for a non-256-QAM PDSCH transmission (e.g., 64 QAM or less). However, increasing the soft buffer size is not possible unless the eNB is capable of 256 QAM.

The present disclosure proposes a new RRC or MAC layer signaling to indicate whether an HOM soft buffer size is enabled. In one embodiment, a value referred to as enable_HOM_soft_buffer_size is sent to the UE 112, indicating that the soft buffer size is computed based on the UE memory capability related to the soft buffer (i.e., the total number of soft channel bits defined in Table 4.1-1 in 3GPP TS 36.306). If enable_HOM_soft_buffer_size=1 is sent to the UE 112, the eNB 102 and the UE 112 should set the soft buffer size based on the maximum memory size of the UE 112 (the total number of soft channel bits defined in Table 4.1-1 in 3GPP TS 36.306), regardless of which CQI table and which MCS table are active. Otherwise, the eNB 102 and the UE 112 should set the soft buffer size according to the legacy rule (e.g., less than the maximum size of the UE 112 soft buffer.

In one embodiment, future releases of LTE will be introduced to support HOM, such as 256 QAM. The new Rel-12 category of UEs 112 has a larger transport block size and total number of soft channel bits than previous UE 112 categories. The UE 112 indicates both new UE 112 categories and legacy UE 112 categories (Rel-8 UE category and if supported, Rel-10 UE category) that the UE 112 supports, so that it can communicate with legacy eNB 102 and new eNB 102. Since the UE 112 does not know whether the serving eNB 102 is a legacy eNB 102 or a new Rel-12 eNB 102, the UE 112 and eNB 102 may need a predetermined way to determine when to use the increased soft buffer size. In one embodiment, the UE 112 and the eNB 102 set the soft buffer size for HARQ operations based on the total number of soft channel bits (defined in Table 4.1-1 in 3GPP TS 36.306) associated with the new UE 12 category, only when the HOM (CQI and/or MCS) tables are active. Alternatively, in order to utilize the larger soft buffer size even when the HOM tables are not active, the new RRC or MAC layer signaling, using the enable_HOM_soft_buffer_size parameter (e.g., having a value of 1), can be sent to the UE 112 by the eNB 102, indicating that the soft buffer size is set based on the total number of soft channel bits associated with the new UE 112 category. Otherwise, the eNB 102 and the UE 112 should set the soft buffer size according to the legacy UE 112 category.

The communication component 214 is configured to communicate information between the UE 112 and a serving cell. In one embodiment, the UE 112 is configured to receive PDCCH or enhanced PDCCH (EPDCCH) and PDSCH communications from an eNB 102 and process and interpret the information for the UE 112. In one embodiment, the communication component 214 receives and processes a PDSCH based on an MCS of a selected table. For example, the communication component 214 may receive an $I_{MCS}$ value indicating a specific entry in a table to be used to process a PDSCH component. The communication component 214 may reference the specific entry in the table selected by the table selection component 204 to determine the MCS for the specific PDSCH. The UE 112 may then decode the PDSCH and use or forward the information as needed.

Figure 3:
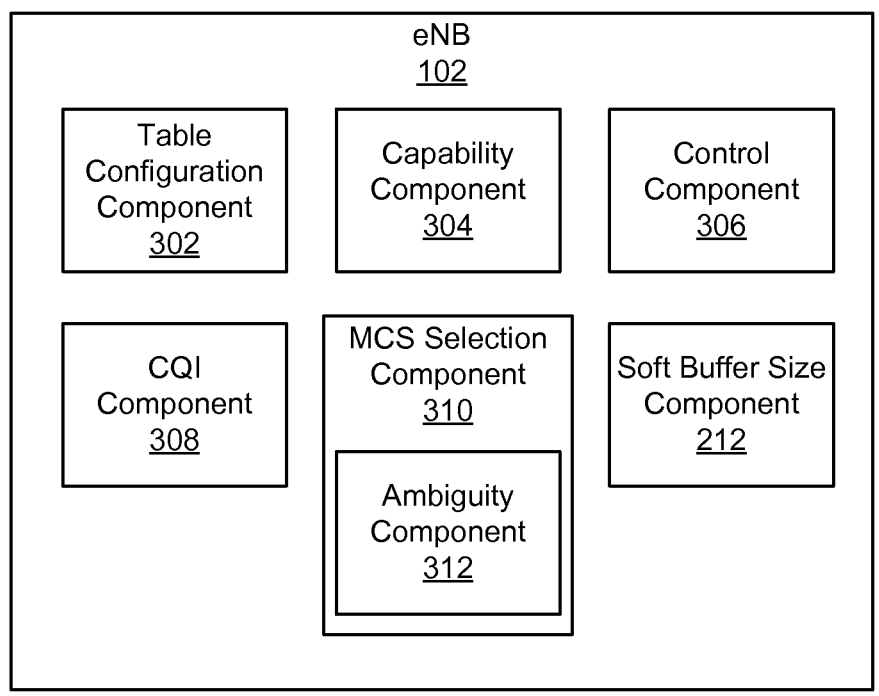
FIG. 3 is a schematic block diagram of example components of a base station.

FIG. 3 is a schematic block diagram of an eNB 102. The eNB 102 includes a table configuration component 302, a capability component 304, a control component 306, a CQI component 308, an MCS selection component 310, and a soft buffer size component 212. The MCS selection component 310 includes, in one embodiment, an ambiguity component 312. The components 302-312 and 212 are given by way of example only and may not all be included in all embodiments. Some embodiments may include any one or any combination of two or more of the components 302-312 and 212. In one embodiment, the components 302-312 and 212 may be included within any serving cell, such as an RNC for a small cell.

The table configuration component 302 is configured to maintain and/or configure a plurality of tables for selection and indication of modulation schemes, coding rates, transport block size, or the like. Specifically, the table configuration component 302 may store, configure, or maintain any of the variations on the default and secondary tables discussed above in relation to the table selection component 204 of the UE 112. For example, the table configuration component 302 may store one or more of Table 1, Table 2, Table 3, Table 4, Table 5, Table 6, Table 7, and Table 8 above. In one embodiment, the table configuration component 302 is configured to configure a secondary table. For example, the table configuration component 302 may generate and send a table configuration message to configure one or more entries of a secondary table. In one embodiment, the table configuration component 302 is also configured to determine which of a default table and secondary table should be used.

The table configuration component 302 may determine a table to be used in a current resource block and notify the UE 112 of the selected table, such as via RRC or MAC layer signaling. Any of the variations discussed above in relation to the default table and secondary table, configuration of the default table and secondary table, and selection of the default table may be performed or determined by the table configuration component 302 on the network side.

The capability component 304 is configured to determine whether a specific UE 112 is capable of a high order modulation scheme (e.g., 256 QAM). For example, the eNB 102 may be located in a small cell, capable of HOM, and in communication with the UE 112. In one embodiment, the capability component 304 determines that the UE 112 is capable of the high order modulation scheme based on a 3GPP release version of the UE 112. For example, if the UE 112 has a release version that is capable of 256 QAM, the eNB 102 may assume that the UE 112 is capable of 256 QAM and that the UE 112 is capable of maintaining and selecting a default table and a secondary table.

The control component 306 is configured to send information to the UE 112 to configure operation of the UE. For example, the control component 306 may send a signal indicating which of a default table or a secondary table should be used to decode a communication. Furthermore, the control component 306 may send control information to a UE 112 to configure a downlink communication. For example, the control component 306 may send DCI to the UE 112 in a PDCCH/EPDCCH communication. In one embodiment, the control component 306 sends control information comprising a value, such as $I_{MCS}$, indicating the MCS to receive and process the PDSCH communication. For example, the $I_{MCS}$ value may indicate which entry of a selected table should be used to decode and process the PDSCH communication. In one embodiment, the $I_{MCS}$ value is determined by the MCS selection component 310 which may provide the $I_{MCS}$ value to the control component 306 for inclusion in DCI. In one embodiment, the $I_{MCS}$ value corresponds to an MCS to be used during an ambiguity period. In one embodiment, the control component 306 provides a message (such as MAC or RRC layer message including a value for an enable_HOM_soft_buffer_size parameter) indicating a soft buffer size to be used by the UE 112 and eNB 102.

The CQI component 308 is configured to receive a CQI value from a UE 112. The CQI value may indicate a maximally supported modulation and coding rate. For example, the CQI value may correspond to an MCS that would provide a best downlink data rate between the eNB 102 and the UE 112. In one embodiment, the CQI component 308 receives CQI information for a first channel and a second channel. The CQI values may be communicated using one or more of an absolute CQI value or a differential CQI value.

The MCS selection component 310 is configured to determine an MCS to be used for a specific communication. In one embodiment, the MCS selection component 310 determines the MCS based on information about a channel received from the UE 112. For example, the MCS selection component 310 may receive a CQI (via the CQI component 308 discussed below) from the UE 112 that indicates a maximally supported modulation and coding rate. The MCS selection component 310 may use the recommendation from the UE 112 to determine what MCS should be used for a PDSCH. In one embodiment, the MCS selection component 310 references a selected CQI table based on the CQI value to determine the UE 112 recommendation. The MCS selection component 310 may then select an MCS, and a corresponding $I_{MCS}$ value, for communication to the UE 112. For example, the MCS selection component 310 may select an MCS that does not exceed the CQI recommendation by the UE 112. The MCS selection component 310 may provide the $I_{MCS}$ value to the control component 306 for communication to the UE 112.

The ambiguity component 312 is configured to select an ambiguity period table index value. As discussed above, an RRC, MAC, or other layer signaling can indicate which CQI or MCS table is used between the legacy and the HOM tables. However, after an RRC or MAC layer message is sent requesting the UE 112 to change the table from the legacy to the HOM table, or vice versa, the eNB 102 may not know exactly when the UE 112 receives the message and applies the new configuration. This period is referred to as an RRC (reconfiguration) ambiguity period or a MAC (reconfiguration) ambiguity period, depending on whether the signaling is an RRC layer signal or an MAC layer signal.

Figure 5:
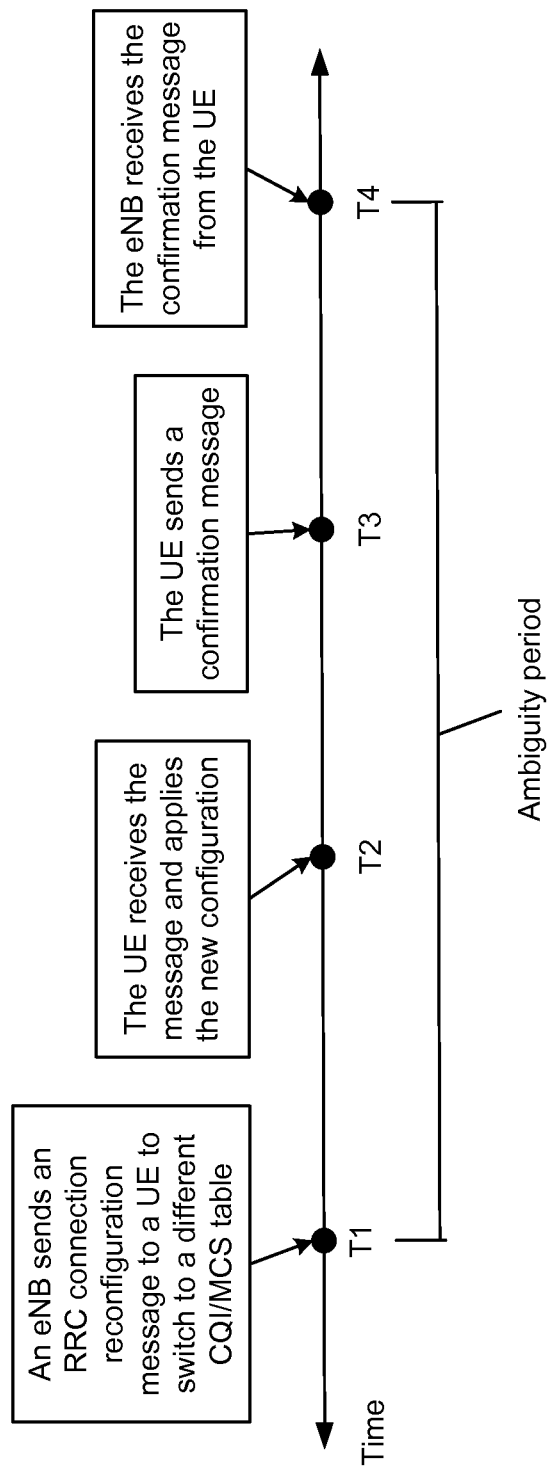
FIG. 5 is schematic flow chart diagram illustrating a method for determining and reporting a channel quality indicator.

FIG. 5 is a schematic diagram illustrating an RRC reconfiguration ambiguity period. T1 corresponds to a time when an eNB 102 sends an RRC connection reconfiguration message to a UE 112 to switch to a different CQI/MCS table. T2 corresponds to a time when the UE 112 receives the message and applies the new configuration. T3 corresponds to a time when the UE 112 sends a confirmation message. T4 corresponds to a time when the eNB 102 receives the confirmation message from the UE 112. However, the eNB 102 does not know when T2 or T3 occurs, thus the UE 102 does not know when the newly selected or switch table is in use by the UE 112 until T4, when a confirmation message is received. Thus, the time from T1 to T4 is the ambiguity period.

During an RRC ambiguity period, if the eNB and the UE use different CQI tables, CQI reports from the UE cannot be appropriately interpreted by the eNB, which makes the eNB difficult to select a proper MCS for the PDSCH transmission. This may significantly degrade the performance during the RRC ambiguity period. During an RRC ambiguity period, if the eNB and the UE use different MCS tables, the UE misinterprets the MCSs applied to the PDSCHs and therefore cannot successfully decode the associated PDSCHs.

According to one embodiment disclosed herein, the eNB 102 selects one of the MCSs that are common to the legacy MCS table and the HOM-MCS table (e.g., a shared entry). For instance, when Table 2 is used as the HOM-MCS table, the eNB 102 may choose an MCS index out of the MCS index set {0, 2, 4, 6, 8, 9, 11, 12, 13, 14, 15, 16, 18, 19, 20, 21, 22, 23, 24, 25, 26}. Note that these MCSs are common between the legacy MCS table (Table 1) and the HOM-MCS table and have the same MCS indices in both tables. By selecting one of these shared entries, the eNB 102 and the UE 112 interpret the MCS index in the same way regardless of which MCS table is used. Thus, whether the HOM table or legacy table is used may not matter during the ambiguity period.

The eNB 102 may also include a soft buffer size component 212 configured to determine a size of a soft buffer to use when communicating with a specific UE 112. For example, the soft buffer size component 212 of the capability component 304 may notify the soft buffer size component 212 when the UE 112 is capable of HOM (e.g., 256 QAM. In response to determining that the UE 112 is capable of HOM, the eNB 102 may send a message indicating that a maximum size of the UE 112 soft buffer should be used. For example, the eNB 102 may send an RRC message with a value for an enable_HOM_soft_buffer_size parameter indicating a soft buffer size to be used by the UE 112 and eNB 102.

FIG. 6 is a schematic flow chart diagram illustrating a method 600 for configuring an MCS at a UE 112. The method 600 may be performed by a UE 112 or other wireless communication device.

The method 600 begins and a table component 202 maintains 602 two or more tables each having entries for a plurality of available modulation schemes. The two or more tables may include a default table and a secondary table. The default table and the secondary table have a same number of entries and the secondary table includes an entry corresponding to a 256-QAM scheme.

A table selection component 204 selects 604 a selected table from one of the default table and the secondary table. The table selection component is configured to use the default table as a default and select the secondary table in response to messaging from an eNB 102 indicating selection of the secondary table. The messaging may include one or more of RRC layer signaling and MAC layer signaling. The table selection component is further configured to select the default table based on a control information format for control information received from the eNB 102.

A control information component 206 receives 606 control information indicating an MCS from the selected table.

For example, the control information may include an $I_{MCS}$ value. A communication component 214 receives and processes 608 a communication from the eNB 102 based on the modulation and coding scheme from the selected table.

FIG. 7 is a schematic flow chart diagram illustrating a method 700 for channel quality indication. The method 700 may be performed by a UE 112 or other wireless communication device.

The method 700 begins and a table component 202 maintains 702 two or more modulation sets each having entries for a plurality of available modulation schemes. The two or more modulation sets include a first modulation set and a second modulation set, wherein the first modulation set and the second modulation set comprise one or more shared entries and one or more unshared entries. The unshared entries are indexed in an ascending or descending order relative to each other, and an unshared entry of the second modulation set comprises an entry corresponding to a 256-QAM scheme.

A table selection component 204 selects 704 the second modulation set. In one embodiment, the table selection component 204 selects 704 the second modulation set based on signaling from a base station, such as RRC or MAC layer signaling.

A channel estimator component 208 estimates 706 a first channel and second channel between the mobile communication device and the base station. The channel estimator component 208 also sends 708 to the base station an index value indicating a quality of the first channel and a differential index value indicating a quality of the second channel. The differential index value includes a value based on the second table arranged in order according to one or more of a modulation value and a transport block size index in the selected table. For example, the index value may include an absolute CQI value and the differential index value may include a differential CQI index value.

Figure 8:
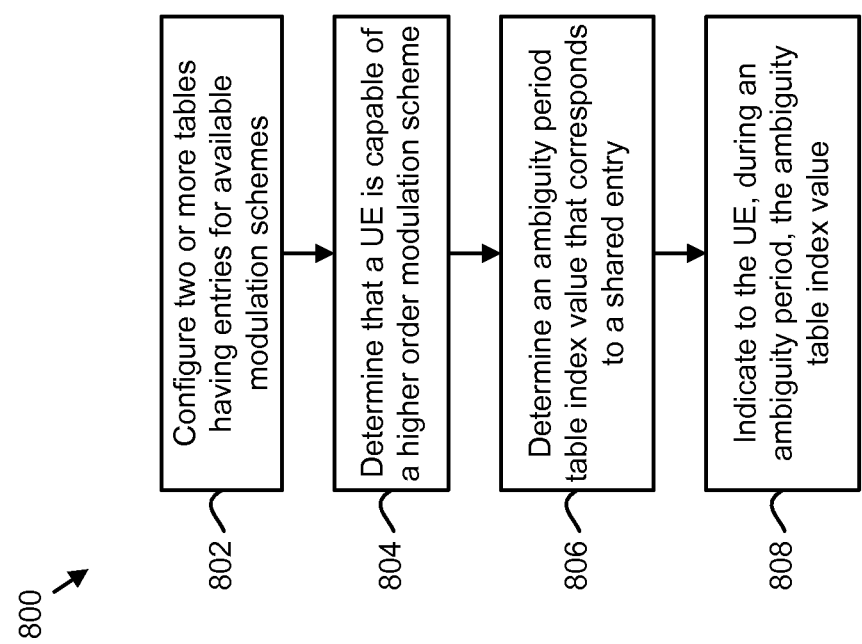
FIG. 8 is schematic flow chart diagram illustrating a method for configuring a modulation and coding scheme during an ambiguity period.

FIG. 8 is a schematic flow chart diagram illustrating a method 800 for configuring an MCS during an ambiguity period. The method 800 may be performed by an eNB 102 or other serving node, such as by a small cell.

The method 800 begins and a table configuration component 302 configures 802 two or more tables at a UE 112 each having entries for a plurality of available modulation schemes. The table configuration component 302 may configure 802 the two or more tables by indicating a selection of two or more preconfigured tables or by indicating entries for a secondary table. The two or more tables include a first table and a second table and a same number of entries. The first table and the second table include one or more shared entries and one or more unshared entries, wherein the one or more shared entries have a same table index value in the first table and the second table. An unshared entry of the second table includes an entry corresponding to a modulation scheme having an HOM than a highest-order modulation scheme of the first table.

A capability component 304 determines 804 that the UE 112 is capable of the modulation scheme having the HOM (e.g., 256 QAM). In one embodiment, the eNB 102 comprises a small cell and the UE 112 is in communication with the small cell.

An ambiguity component 312 determines 806 an ambiguity period table index value that corresponds to a shared entry for use during an ambiguity period. For example, the ambiguity component 312 may determine 806 the ambiguity period table index value based on a CQI received from the UE 112. The ambiguity component 312 also indicates 808 the ambiguity period table index value to the UE 112, such as via DCI.

Figure 9:
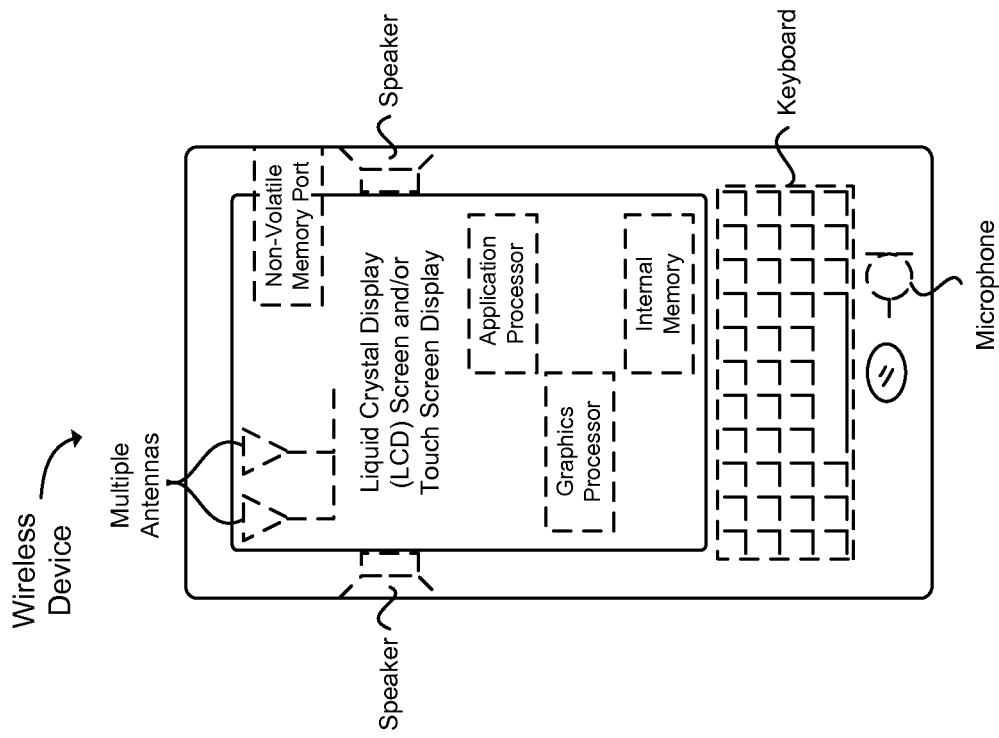
FIG. 9 illustrates a diagram of a wireless device (e.g., UE) in accordance with an example.

FIG. 9 provides an example illustration of a mobile device, such as a UE, a mobile station (MS), a mobile wireless device, a mobile communication device, a tablet, a handset, or other type of mobile wireless device. The mobile device may include one or more antennas configured to communicate with a node, macro node, low power node (LPN), or transmission station, such as a base station (BS), an eNB, a base band unit (BBU), a remote radio head (RRH), a remote radio equipment (RRE), a relay station (RS), a radio equipment (RE), or other type of wireless wide area network (WWAN) access point. The mobile device may be configured to communicate using at least one wireless communication standard including 3GPP LTE, WiMAX, High Speed Packet Access (HSPA), Bluetooth, and WiFi. The mobile device may communicate using separate antennas for each wireless communication standard or shared antennas for multiple wireless communication standards. The mobile device may communicate in a wireless local area network (WLAN), a wireless personal area network (WPAN), and/or a WWAN.

FIG. 9 also provides an illustration of a microphone and one or more speakers that may be used for audio input and output from the mobile device. The display screen may be a liquid crystal display (LCD) screen, or other type of display screen such as an organic light emitting diode (OLED) display. The display screen may be configured as a touch screen. The touch screen may use capacitive, resistive, or another type of touch screen technology. An application processor and a graphics processor may be coupled to internal memory to provide processing and display capabilities. A non-volatile memory port may also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

The following examples pertain to further embodiments.

Example 1 is a UE that includes a table component, a table selection component, a control information component, and a communication component. The table component is configured to maintain two or more tables each having entries for a plurality of available modulation schemes. The two or more tables include a default table and a secondary table. The default table and the secondary table have a same number of entries and the secondary table includes an entry corresponding to a 256-QAM scheme. The table selection component is configured to select a selected table from one of the default table and the secondary table. The table selection component is configured to use the default table as a default and select the secondary table in response to messaging from an eNB indicating selection of the secondary table. The messaging includes one or more of RRC layer signaling and MAC layer signaling. The table selection component is further configured to select the default table based on a control information format for control information received from the eNB. The control information component is configured to receive control information indicating a modulation and coding scheme from the selected table. The communication component configured to receive and process a communication from the eNB based on the modulation and coding scheme from the selected table.

In Example 2, the table selection component in Example 1 is configured to select the default table in response to the control information format comprising DCI format 1A.

In Example 3, the table selection component in any of Examples 1-2 is further configured to select the default table in response to a handover to a target cell.

In Example 4, the UE in any of Examples 1-3 includes a soft buffer comprising a 256-QAM soft buffer size. The UE further includes a soft buffer size component configured to use a soft buffer size less than the 256-QAM soft buffer size until an indication from the eNB to use the 256-QAM soft buffer size is received.

In Example 5, the indication from the eNB in Example 4 includes RRC or MAC layer signaling.

In Example 6, the default table and secondary table in any of Examples 1-5 each include a modulation and coding scheme table used to select a modulation order and transport block size based on a modulation and coding scheme index. The secondary table is for selective use in place of the default table.

In Example 7, the default table of any of Examples 1-6 includes a default modulation and coding scheme table and the secondary table includes a secondary modulation and coding scheme table. The table component is further configured to maintain a default channel quality indicator table and a secondary channel quality indicator table. The table selection component is further configured to select a plurality of selected tables including selecting one of the default modulation and coding scheme table and the secondary modulation and coding scheme table and selecting one of the default channel quality indicator table and the secondary channel quality indicator table.

Example 8 is a mobile communication device that is configured to maintain two or more modulation sets each having entries for a plurality of available modulation schemes. The two or more modulation sets include a first modulation set and a second modulation set. The first modulation set and the second modulation set include one or more shared entries and one or more unshared entries and the unshared entries are indexed in an ascending or descending order relative to each other. The mobile communication device is configured to select the second modulation set based on signaling from a base station. The mobile communication device is configured to estimate a first channel and second channel between the mobile communication device and the base station. The mobile communication device is configured to send to the base station an index value indicating a quality of the first channel and a differential index value indicating a quality of the second channel. The differential index value includes a value based on the second table arranged in order according to one or more of a modulation value and a transport block size index in the selected table.

In Example 9, the first modulation set and second modulation set in Example 8 each include a channel quality indicator modulation set used to indicate a modulation and coding rate preferred by the UE based on a channel quality indicator index. The second modulation set is for selective use in place of the first modulation set.

In Example 10, the first channel and second channel in any of Examples 8-9 are different spatial streams or the first channel corresponds to a wide frequency band and the second channel corresponds to a sub-frequency band of the wide frequency band.

In Example 11, the differential index value in any of Examples 8-10 includes an offset value in relation to the index value.

In Example 12, the one or more shared entries in any of Examples 8-11 have the same index values in the first modulation set and the second modulation set.

Example 13 is an eNB comprising a table configuration component, a capability component, an ambiguity component, and a control component. The table configuration component is configured to configure two or more tables at a UE each having entries for a plurality of available modulation schemes. The two or more tables include a first table and a second table and a same number of entries with respect to one another. The first table and the second table include one or more shared entries and one or more unshared entries and the one or more shared entries have a same table index value in the first table and the second table. An unshared entry of the second table includes an entry corresponding to a modulation scheme having a higher order modulation than a highest-order modulation scheme of the first table. The capability component is configured to determine that the UE is capable of the modulation scheme having the higher order modulation. The eNB is in communication with the UE in a small cell. The ambiguity component is configured to determine an ambiguity period table index value that corresponds to a shared entry for use during an ambiguity period. The control component is configured to send a signal to the UE indicating which of the first table and the second table are selected and to further send, during the ambiguity period, a signal to the UE indicating the ambiguity period table index value.

In Example 14, the ambiguity period in Example 13 includes a period between the eNB sending a signal indicating the selected table to the UE and the eNB receiving a signal from the UE indicating that the UE received the signal indicating the selected table.

In Example 15, the first table and second table in any of Examples 13-14 each include a channel quality indicator table used to indicate a modulation and coding rate preferred by the UE based on a channel quality indicator index. The second table is for selective use in place of the first table.

In Example 16, the eNB in any of Examples 13-15 includes a channel estimator component that is configured to receive the channel quality indicator index indicating a preferred modulation and coding rate based on the channel between the eNB and the UE. The eNB also includes a modulation and coding scheme component configured to select the ambiguity period table index value based on the channel quality indicator index received from the UE.

In Example 17, the control component in any of Examples 13-16 is configured to send signaling to the UE comprising an indication enabling use of a 256-QAM soft buffer size.

In Example 18, the indication enabling use of a 256-QAM soft buffer size in any of Examples 13-17 includes one or more of RRC and MAC layer signaling.

In Example 19, the first table and second table in any of Examples 13-18 each include a modulation and coding scheme table used to select a modulation order and transport block size based on a modulation and coding scheme index. The second table is for selective use in place of the first table.

In Example 20, the first table in any of Examples 13-19 includes a first modulation and coding scheme table and the second table includes a second modulation and coding scheme table. The table component is further configured to maintain a first channel quality indicator table and a second channel quality indicator table. The table selection component is further configured to select a plurality of selected tables by selecting one of the default modulation and coding scheme table and the secondary modulation and coding scheme table and selecting one of the default channel quality indicator table and the secondary channel quality indicator table.

Example 21 is a method for selecting a modulation and coding scheme that includes maintaining two or more tables each having entries for a plurality of available modulation schemes. The two or more tables include a default table and a secondary table. The default table and the secondary table have a same number of entries and the secondary table includes an entry corresponding to a 256-QAM scheme. The method includes selecting a selected table from one of the default table and the secondary table. The method includes using the default table as a default and selecting the secondary table in response to messaging from an eNB indicating selection of the secondary table. The messaging includes one or more of RRC layer signaling and MAC layer signaling. The method includes selecting the default table based on a control information format for control information received from the eNB. The method includes receiving control information indicating a modulation and coding scheme from the selected table. The method includes receiving and processing a communication from the eNB based on the modulation and coding scheme from the selected table.

In Example 22, selecting the selected table in Example 21 includes selecting the default table in response to the control information format comprising DCI format 1A.

In Example 23, selecting the selected table in any of Examples 21-22 includes selecting the default table in response to a handover to a target cell.

In Example 24, the UE in any of Examples 21-23 includes a soft buffer comprising a 256-QAM soft buffer size. The method further includes using a soft buffer size less than the 256-QAM soft buffer size until an indication from the eNB to use the 256-QAM soft buffer size is received.

In Example 25, the indication from the eNB in Example 24 includes RRC or MAC layer signaling.

In Example 26, the default table and secondary table in any of Examples 21-25 each include a modulation and coding scheme table used to select a modulation order and transport block size based on a modulation and coding scheme index. The secondary table is for selective use in place of the default table.

In Example 27, the default table of any of Examples 21-26 includes a default modulation and coding scheme table and the secondary table includes a secondary modulation and coding scheme table. The method further includes maintaining a default channel quality indicator table and a secondary channel quality indicator table. The method includes selecting a plurality of selected tables including selecting one of the default modulation and coding scheme table and the secondary modulation and coding scheme table and selecting one of the default channel quality indicator table and the secondary channel quality indicator table.

Example 28 is a method for channel quality indication that includes maintaining two or more modulation sets each having entries for a plurality of available modulation schemes. The two or more modulation sets include a first modulation set and a second modulation set. The first modulation set and the second modulation set include one or more shared entries and one or more unshared entries and the unshared entries are indexed in an ascending or descending order relative to each other. The method includes selecting the second modulation set based on signaling from a base station. The method includes estimating a first channel and second channel between the mobile communication device and the base station. The method includes sending to the base station an index value indicating a quality of the first channel and a differential index value indicating a quality of the second channel. The differential index value includes a value based on the second table arranged in order according to one or more of a modulation value and a transport block size index in the selected table.

In Example 29, the first modulation set and second modulation set in Example 28 each include a channel quality indicator modulation set used to indicate a modulation and coding rate preferred by the UE based on a channel quality indicator index. The second modulation set is for selective use in place of the first modulation set.

In Example 30, the first channel and second channel in any of Examples 28-29 are different spatial streams or the first channel corresponds to a wide frequency band and the second channel corresponds to a sub-frequency band of the wide frequency band.

In Example 31, the differential index value in any of Examples 28-30 includes an offset value in relation to the index value.

In Example 32, the one or more shared entries in any of Examples 28-31 have the same index values in the first modulation set and the second modulation set.

Example 33 is a method for configuring a modulation and coding scheme that includes configuring two or more tables at a UE each having entries for a plurality of available modulation schemes. The two or more tables include a first table and a second table and a same number of entries with respect to one another. The first table and the second table include one or more shared entries and one or more unshared entries and the one or more shared entries have a same table index value in the first table and the second table. An unshared entry of the second table includes an entry corresponding to a modulation scheme having a higher order modulation than a highest-order modulation scheme of the first table. The method includes determining that the UE is capable of the modulation scheme having the higher order modulation. An eNB is in communication with the UE in a small cell. The method includes determining an ambiguity period table index value that corresponds to a shared entry for use during an ambiguity period. The method includes sending a signal to the UE indicating which of the first table and the second table are selected and sending, during the ambiguity period, a signal to the UE indicating the ambiguity period table index value.

In Example 34, the ambiguity period in Example 33 includes a period between the eNB sending a signal indicating the selected table to the UE and the eNB receiving a signal from the UE indicating that the UE received the signal indicating the selected table.

In Example 35, the first table and second table in any of Examples 33-34 each include a channel quality indicator table used to indicate a modulation and coding rate preferred by the UE based on a channel quality indicator index. The second table is for selective use in place of the first table.

In Example 36, the method in any of Examples 33-35 includes receiving the channel quality indicator index indicating a preferred modulation and coding rate based on the channel between the eNB and the UE. The method also includes a selecting the ambiguity period table index value based on the channel quality indicator index received from the UE.

In Example 37, the method in any of Examples 13-16 includes sending signaling to the UE including an indication enabling use of a 256-QAM soft buffer size.

In Example 38, the indication enabling use of a 256-QAM soft buffer size in any of Examples 33-37 includes one or more of RRC and MAC layer signaling.

In Example 39, the first table and second table in any of Examples 33-38 each include a modulation and coding scheme table used to select a modulation order and transport block size based on a modulation and coding scheme index. The second table is for selective use in place of the first table.

In Example 40, the first table in any of Examples 33-39 includes a first modulation and coding scheme table and the second table includes a second modulation and coding scheme table. The method further includes maintaining a first channel quality indicator table and a second channel quality indicator table. The method includes selecting a plurality of selected tables by selecting one of the default modulation and coding scheme table and the secondary modulation and coding scheme table and selecting one of the default channel quality indicator table and the secondary channel quality indicator table.

Example 41 is an apparatus that includes means to perform a method as in any of Examples 21-40.

Machine readable storage including machine-readable instructions, when executed, to implement a method or realize an apparatus as claimed in any of Examples 21-14.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles of the disclosure. The scope of the present disclosure should, therefore, be determined only by the following claims.

The invention claimed is:

1. An apparatus for a radio access network, comprising:
one or more processors; and
one or more hardware storage devices having stored thereon computer-executable instructions that are executable by the one or more processors to cause the apparatus to perform the following:
determine a first modulation and coding scheme (MCS) according to a default MCS table;

determine a second MCS according to a secondary MCS table, the secondary MCS table comprising an entry corresponding to a 256-quadrature amplitude modulation (QAM) scheme;

generate a radio resource control (RRC) layer message for a user equipment (UE), the RRC layer message indicating the secondary MCS table is to be used and indicating a maximum soft buffer size to be used by the UE and the apparatus regardless of which MCS table and which of a default channel quality indicator (CQI) table or a secondary CQI table are active, wherein a size of the buffer is based on a total number of soft channel bits associated with the UE, and wherein the maximum soft buffer size of the UE is configured for the secondary MCS table and the secondary CQI table, the secondary CQI table comprising an entry corresponding to a 256-QAM scheme;

decode a CQI report from the UE, the CQI report including a differential CQI value, the differential CQI value being associated with the secondary CQI table, wherein the CQI report also includes a first CQI value, the first CQI value being determined based on a first codeword, wherein the differential CQI value is also associated with an offset level of a second codeword, the offset level of the second codeword being based on the first CQI value and a second CQI value that is determined based on the second codeword;

select one of the default MCS table and the secondary MCS table based on the CQI report and availability of the secondary MCS table; and generate downlink control information (DCI) for the UE, the DCI having a DCI format that is selected based on the selected one of the default MCS table and the secondary MCS table, wherein the generated DCI includes a modulation and coding scheme value that indicates an entry of an MCS to be used during an ambiguity period, wherein the MCS is common to both the default MCS table and secondary MCS table.

2. The apparatus of claim 1, wherein the computer-executable instructions further include instructions that are executable to cause the apparatus to perform the following:
generate physical downlink shared channel (PDSCH) data using the selected one of the default MCS table and the secondary MCS table.

3. The apparatus of claim 1, wherein the RRC layer message includes a value that indicates selection of the secondary MCS table.

4. The apparatus of claim 1, wherein the default MCS table is selected when the DCI format is DCI format 1A.

5. The apparatus of claim 1, wherein the computer-executable instructions further include instructions that are executable to cause the apparatus to perform the following:
select one of the default CQI table and the secondary CQI table based at least in part on the availability of the secondary MCS table.

6. The apparatus of claim 5, wherein the computer-executable instructions further include instructions that are executable to cause the apparatus to perform the following:
obtain a second CQI report based on the selected one of the default CQI table and the secondary CQI table.

7. The apparatus of claim 1, wherein the offset level of the second codeword is determined by subtracting the second CQI value from the first CQI value.

8. The apparatus of claim 1, wherein the first codeword and the second codeword are associated with a spatially multiplexed transmission.

* * * * *